US012670651B2

(12) United States Patent (10) Patent No.: US 12,670,651 B2
Yuan (45) Date of Patent: Jun. 30, 2026

---

(54) VIDEO PLAYING METHOD AND APPARATUS, ELECTRONIC DEVICE, MEDIUM, AND PROGRAM PRODUCT

(71) Applicant: Tencent Technology (Shenzhen) Company Limited, Shenzhen (CN)

(72) Inventor: Jiaping Yuan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 185 days.

(21) Appl. No.: 18/374,479

(22) Filed: Sep. 28, 2023

(65) Prior Publication Data

US 2024/0020910 A1 Jan. 18, 2024

Related U.S. Application Data

(63) Continuation of application No. PCT/CN2023/072548, filed on Jan. 17, 2023.

(30) Foreign Application Priority Data

Mar. 10, 2022 (CN) .......................... 202210234153.7

(51) Int. Cl.
*G06T 15/04* (2011.01)
*G06T 19/20* (2011.01)
(52) U.S. Cl.
CPC .............. *G06T 15/04* (2013.01); *G06T 19/20* (2013.01); *G06T 2200/24* (2013.01); *G06T 2219/2016* (2013.01)
(58) Field of Classification Search
CPC ..... G06T 15/04; G06T 19/20; G06T 2200/24; G06T 2219/2016; G06T 7/70;
(Continued)

(56) References Cited

U.S. PATENT DOCUMENTS

2011/0310100 A1   12/2011   Adimatyam et al.
2015/0228106 A1*   8/2015   Laksono ................. G06T 15/04
                                                           345/419
2016/0162244 A1    6/2016   Christmas et al.

FOREIGN PATENT DOCUMENTS

CN          101021952 A  *  8/2007
CN          102917237 A      2/2013
(Continued)

OTHER PUBLICATIONS

International Search Report issued May 9, 2023 in Application No. PCT/CN2023/072548, with English Translation, pp. 1-5.

*Primary Examiner* — Haixia Du
(74) *Attorney, Agent, or Firm* — ARENTFOX SCHIFF LLP

(57) ABSTRACT

In a method for displaying video, a first target surface of a geometric body on which a first target video is to be displayed is determined. Pixel point sets corresponding to respective video frames of the first target video are obtained. Each of the respective video frames is mapped to the first target surface based on a mapping relationship between position information of pixel points in the pixel point sets of the respective video frame and position information of a plurality of vertices on the first target surface. The respective video frames include a target video frame that is displayed on the first target surface based on the mapping of the target video frame to the first target surface. The first target video is displayed on the first target surface of the geometric body based on the mapping of the respective video frames to the first target surface.

18 Claims, 11 Drawing Sheets

(58) Field of Classification Search
    CPC .............. H04N 21/4728; H04N 21/816; G06F
                                    3/0484; G06F 3/04845
    See application file for complete search history.

(56)                        References Cited

FOREIGN PATENT DOCUMENTS

CN          110163947  A      8/2019
WO          WO-9845767  A2  *  10/1998   .............. G06F  8/34

* cited by examiner

Slide left and right to select and
acquire more information

S301

Acquire a target video in response to a video playing operation triggered for a target surface of a cubic geometric body

S302

Obtain pixel point sets corresponding to respective video frames included in the target video separately and map the respective video frames to the target surface successively based on a mapping relationship between position information about each pixel point in each pixel point set and position information about each vertex on the target surface

FIG. 3

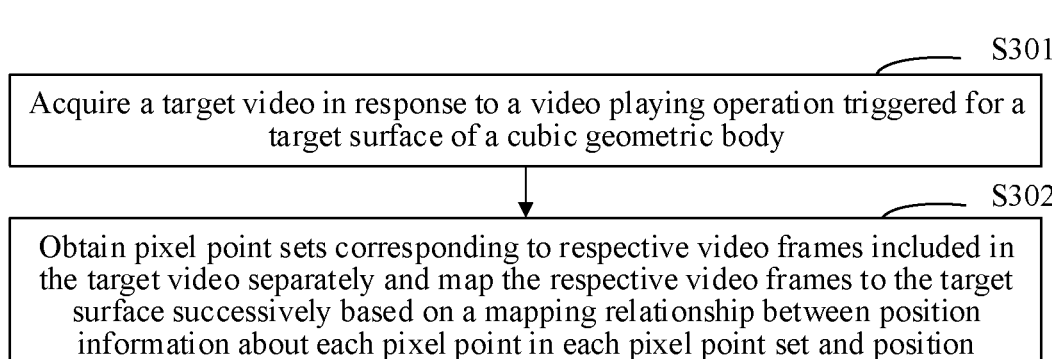

Sphere                UV plane

Earth pattern

Create a video element

S502

Bind the video element to a video texture

S503

Create a geometry and a surface material of a 3D model

S504

Bind the video texture to the surface material of the 3D model

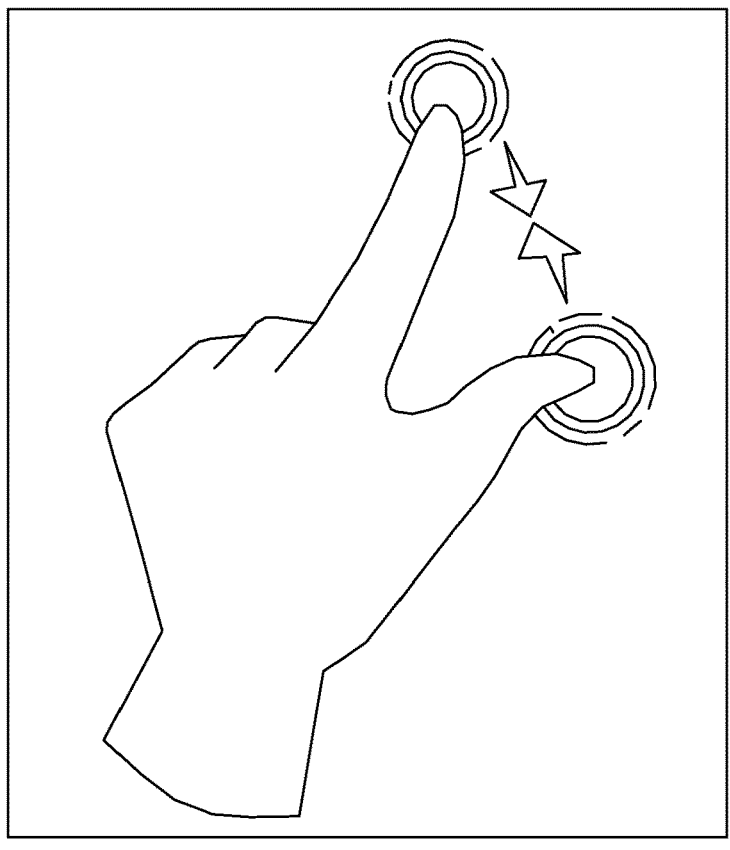

FIG. 8e

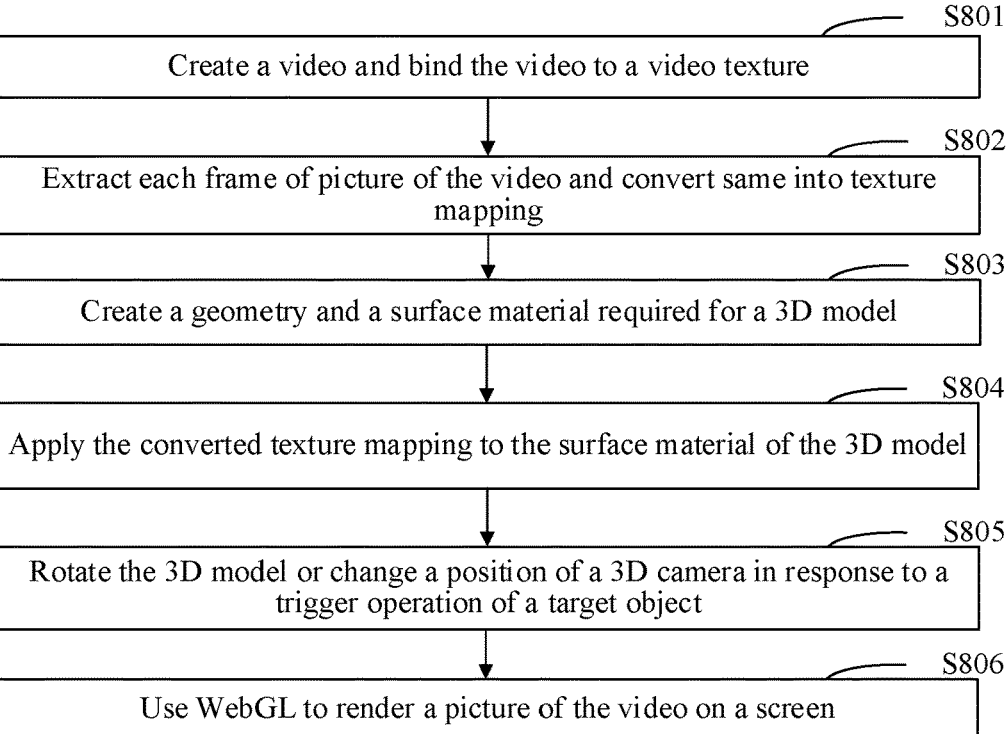

S801
Create a video and bind the video to a video texture

S802
Extract each frame of picture of the video and convert same into texture mapping S803
Create a geometry and a surface material required for a 3D model S804
Apply the converted texture mapping to the surface material of the 3D model S805
Rotate the 3D model or change a position of a 3D camera in response to a trigger operation of a target object S806
Use WebGL to render a picture of the video on a screen

FIG. 8f

VIDEO PLAYING METHOD AND APPARATUS, ELECTRONIC DEVICE, MEDIUM, AND PROGRAM PRODUCT

RELATED APPLICATIONS

This application is a continuation of International Application No. PCT/CN2023/072548, filed on Jan. 17, 2023, which claims priority to Chinese Patent Application No. 202210234153.7, entitled "VIDEO PLAYING METHOD AND APPARATUS, ELECTRONIC DEVICE, AND STORAGE MEDIUM", and filed on Mar. 10, 2022. The entire disclosures of the prior applications are hereby incorporated by reference.

FIELD OF THE TECHNOLOGY

The embodiments of this disclosure relate to the field of computer technology, including to video playing.

BACKGROUND OF THE DISCLOSURE

Texture map, also referred to as texture mapping, includes the process of establishing a corresponding relationship between 3 dimensional (3D) model surfaces and pixel coordinates in 2D image space. The originally constructed 3D model has no texture features. To make the 3D model have better visual effects, texture mapping may be performed on the 3D model.

For example, referring to FIG. 1, there are a plurality of surfaces of the 3D model in a 3D scene in FIG. 1, and different pictures are separately displayed on each surface according to a texture mapping. As such, a target object may jump or move to different surfaces by clicking or sliding to view picture information presented on the different surfaces.

Although the above solution also applies the 3D technology, static pictures are used as the texture mapping on each surface of the 3D model. Therefore, picture information presented on each surface is fixed after pasting the static pictures on each surface of the 3D model. Even if the static pictures on each surface may be updated at a set time interval, less picture information can be acquired by the target object from the surfaces of the 3D model, thus failing to fully engage the viewing interest of the target object.

SUMMARY

In order to solve the technical problem present in the related art, the embodiments of this disclosure provide a video playing method and apparatus, an electronic device, a non-transitory computer-readable storage medium, and a program product. It can enable the target object to acquire more information and more fully engage the viewing interest of the target object. At the same time, it can enhance the 3D spatial immersion of the target object and improve the viewing experience of the target object.

In an aspect, the embodiments of this disclosure provide a method for displaying video. In the method, a first target surface of a geometric body on which a first target video is to be displayed is determined. Pixel point sets corresponding to respective video frames of the first target video are obtained. Each of the respective video frames is mapped to the first target surface based on a mapping relationship between position information of pixel points in the pixel point sets of the respective video frame and position information of a plurality of vertices on the first target surface. The respective video frames include a target video frame that is displayed on the first target surface based on the mapping of the target video frame to the first target surface. The first target video is displayed on the first target surface of the geometric body based on the mapping of the respective video frames to the first target surface In an aspect, the embodiments of this disclosure provide a video processing apparatus, including processing circuitry. The processing circuitry is configured to determine a first target surface of a geometric body on which a first target video is to be displayed. The processing circuitry is configured to obtain pixel point sets corresponding to respective video frames of the first target video. The processing circuitry is configured to map each of the respective video frames to the first target surface based on a mapping relationship between position information of pixel points in the pixel point sets of the respective video frame and position information of a plurality of vertices on the first target surface. The respective video frames include a target video frame that is displayed on the first target surface based on the mapping of the target video frame to the first target surface. The processing circuitry is configured to display the first target video on the first target surface of the geometric body based on the mapping of the respective video frames to the first target surface.

In an aspect, the embodiments of this disclosure provide a computer device, including a memory, a processor, and a computer program stored in the memory and run on the processor which, when executes the program, performs the video display method.

In an aspect, the embodiments of this disclosure provide a non-transitory computer-readable storage medium storing instructions which, when executed by a processor, cause the processor to perform the video display method.

In an aspect, the embodiments of this disclosure provide a computer program product, including a computer program stored in a computer-readable storage medium, the computer program, when executed by a processor, implementing the video display method.

This disclosure can have the following beneficial effects.

A target video is acquired in response to a video playing operation triggered for a target surface of a cubic geometric body. The respective video frames included in the target video are mapped to the target surface successively based on a mapping relationship between position information about each pixel point in the video frames and position information about each vertex on the target surface. As such, every time a video frame is mapped, the mapped video frame is played. This disclosure enables a video to be played in a 3D scene by mapping the video as a texture to the surfaces of the cubic geometric body and playing the video on the surfaces of the cubic geometric body. Compared with the way of pasting a static picture as a texture on the surfaces of the cubic geometric body, the solution can enable the viewer to acquire more information and fully arouse the viewing interest of the viewer. At the same time, it can enhance the 3D spatial immersion of the target object and improve the viewing experience of the target object.

Additional features and advantages of this disclosure will be set forth in the following specification. In addition, part of the features and advantages will be apparent from the specification or may be recognized by implementing this disclosure. Exemplary objectives and other advantages of this disclosure may be realized and obtained by the structures particularly specified in the written specification, claims, and drawings.

BRIEF DESCRIPTION OF THE DRAWINGS

FIG. 3 is a flowchart of a video playing method in an embodiment of this disclosure.

FIG. 4 is a schematic diagram of a process of texture mapping in an embodiment of this disclosure.

FIG. 5*a* is a flowchart of another video playing method in an embodiment of this disclosure.

FIG. 8*e* is a schematic diagram of another multi-finger opposite sliding operation in an embodiment of this disclosure.

FIG. 8*f* is a general flowchart of a video playing method in an embodiment of this disclosure.

DESCRIPTION OF EMBODIMENTS

Figure 1:
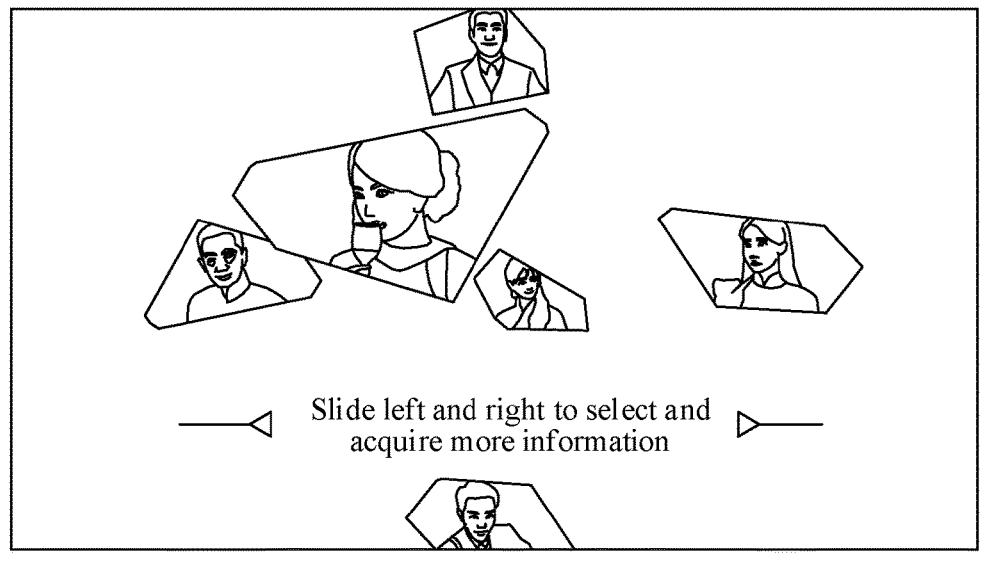
FIG. 1 is a schematic diagram of texture mapping of a 3D scene.

To make the objectives, technical solutions, and advantages of the embodiments of this disclosure clearer, the technical solutions of this disclosure are described below in conjunction with the drawings in the embodiments of this disclosure. The embodiments described are only some, but not all embodiments of the technical solutions of this disclosure. Other embodiments shall fall within the scope of the technical solutions of this disclosure.

In this specification, claims, and the foregoing drawings of this disclosure, the terms "first", "second", and the like are intended to distinguish between similar objects and not necessarily for describing a specific order or chronological order. It is to be understood that the data used in this way are interchangeable under appropriate circumstances such that the embodiments of this disclosure described herein can be implemented in a sequence than those illustrated or described herein.

Some terms in the embodiments of this disclosure are explained below to facilitate understanding by those skilled in the art.

In an aspect, a 3D model includes a cubic geometric body or a 3D object.

In an aspect, Hyper text markup language 5 (HTML5) is a way of language description used to build web content. For example, HTML5, a next generation of Internet standards, is a way of language to build and present the Internet content. It is considered as one of the core technologies of the Internet. HTML5 is the specification of the core language HTML in the web. When the target object uses any manners to browse a web page, the content is originally in a HTML format, but is converted into recognizable information by some technical processes.

In an example, HTML5 specifies a labeling method for including the video by a video element, and the video element can be used for playing the video.

In an aspect, Web graphics library (WebGL) is a 3D drawing protocol. This drawing technology standard allows JavaScript and OpenGL ES 2.0 to be combined together, so that WebGL can provide hardware 3D accelerated rendering for HTML5 Canvas by adding a JavaScript binding of OpenGL ES 2.0. As such, the web developers can present 3D scenes and models in a browser more smoothly by a system graphics card. Canvas is part of HTML5, and allows the scripting language to dynamically render bit images.

In an aspect, Threejs is a 3D engine running in the browser. It can be used to create various 3D scenes in the web. Threejs is an easy-to-use 3D graphics library formed by the encapsulation and simplification of a WebGL interface, and includes various objects, such as cameras, shadows, and materials.

In an aspect, a 3D camera is used in simulating the scene seen by human eyes.

The word "exemplary" used hereinafter means "serving as an example, embodiment, or illustration". Any embodiment described as "exemplary" is not necessarily to be construed as preferred or better than other embodiments.

In the text, the terms "first" and "second" are merely used for describing the objectives and are not understood as expressing or implying the relative importance, or implicitly indicating the number of indicated technical features. Thus, features defined with the "first" or "second" may explicitly or implicitly include one or more of the features. In the description of the embodiments of this disclosure, unless otherwise specified, "a plurality of" means two or more.

The design ideas of the embodiments of this disclosure are briefly described below.

In the related art, as shown in FIG. 1, a static picture may be used as the texture mapping on different surfaces of the 3D model. As such, the using object may view information included in the respective static picture on different surfaces by switching to different surfaces of the 3D model.

However, according to the above solution, after pasting the static picture on different surfaces of the 3D model, the picture information presented on these surfaces is fixed. Limited information can be acquired by the using object from these surfaces, thus failing to arouse the viewing interest of the using object. In addition, the way of using the static picture as the texture mapping of the 3D model does not enable the using object to visually and strongly feel the spatial immersion brought by 3D, resulting in a poor viewing experience of the using object.

In view of this, the embodiments of this disclosure provide a video playing method and apparatus, an electronic device, and a storage medium. A target video is acquired in response to a video playing operation triggered by a target object for a target surface of a cubic geometric body. The respective video frames included in the target video are mapped to the target surface successively based on a mapping relationship between position information about each pixel point in the video frames and position information about each vertex on the target surface. As such, every time a video frame is mapped, the mapped video frame is played for the target object. By mapping the 2D video to the surfaces of the cubic geometric body, the effect of playing the video on the surfaced of the cubic geometric body can be formed visually. For one thing, it enables the target object to acquire more useful information by the video and increases the viewing interest of the target object. For another thing, it enables the target object to more fully feel the charm of 3D technology, enhances the 3D spatial immersion of the target object, and improves the viewing experience of the target object.

Exemplary embodiments of this disclosure are described below in connection with the drawings of the specification. It is to be understood that the embodiments described herein are merely used for illustrating and explaining this disclosure, and are not used for limiting this disclosure. The embodiments of this disclosure and the features of the embodiments may be combined in various manners with one another without conflict.

Figure 2:
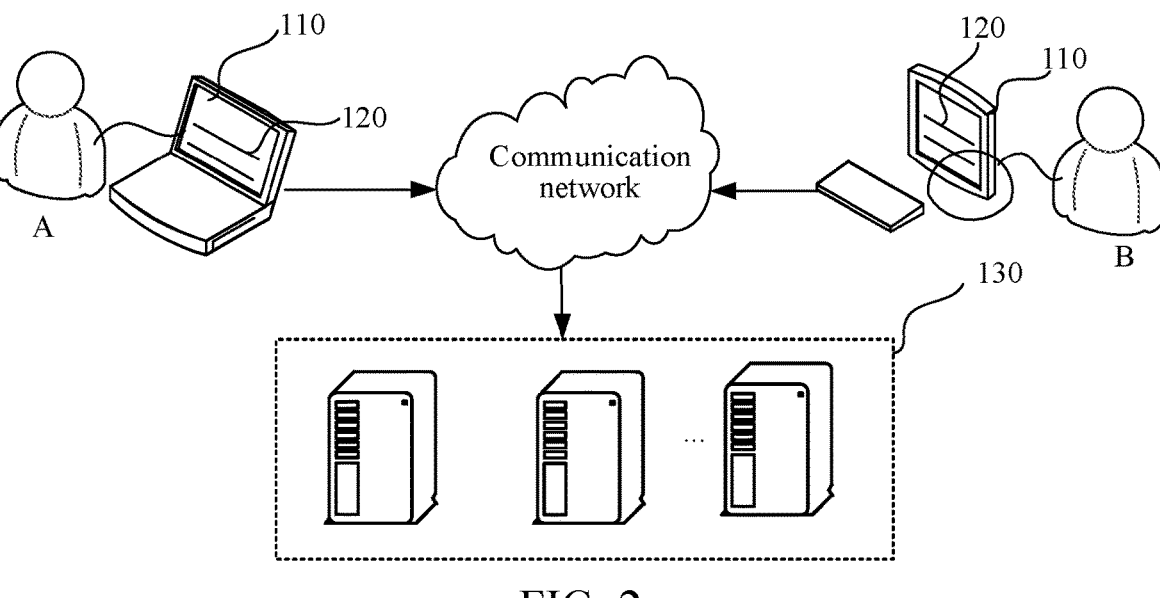
FIG. 2 is a schematic diagram of an application scene in an embodiment of this disclosure.

With reference to FIG. 2, a schematic diagram of an application scene in an embodiment of this disclosure is shown. The application scene includes at least a terminal device 110 and a server 130. The application operation interface 120 may be logged in by the terminal device 110. There may be one or more terminal devices 110 and one or more servers 130. This disclosure does not specifically define the number of the terminal devices 110 and the servers 130. The terminal device 110 and the server 130 may communicate via a communication network.

In the embodiments of this disclosure, both the terminal device 110 and the server 130 belong to the computer device. A video application having a video playing function is pre-installed in the terminal device 110. The target object may watch a video by the video playing interface of the video application. The type of the video application includes a client application, a web page application, and an applet. The terminal device 110 may be, but is not limited to, a personal computer, a mobile phone, a tablet computer, a notebook, an e-book reader, a smart home, an intelligent voice interaction device, and a vehicle-mounted terminal.

The server 130 may be an independent physical server, may be a server cluster or a distributed system of a plurality of the physical servers, or may be a cloud server providing basic cloud computing services, such as cloud service, cloud database, cloud computing, cloud function, cloud storage, network service, cloud communication, middleware service, domain name service, security service, content delivery network (CDN), and big data and artificial intelligence platforms. The terminal device 110 and the server 130 may be directly or indirectly connected by a wired or wireless communication way, which is not limited in this disclosure.

The video playing method in the embodiments of this disclosure may be executed by the terminal device 110, by the server 130, and by the interaction of the terminal device 110 and the server 130.

For example, the terminal device 110 executes the video playing method in the embodiments of this disclosure, and the method includes the following steps.

The terminal device 110 acquires a target video in response to a video playing operation triggered by a target object for a target surface of a cubic geometric body in a video playing interface of a video application; and obtains pixel point sets corresponding to respective video frames included in the target video separately and maps the respective video frames to the target surface successively based on a mapping relationship between position information about each pixel point in each pixel point set and position information about each vertex on the target surface. Every time a video frame is mapped, the mapped video frame is played for the target object.

FIG. 2 is an exemplary introduction to the application scene of the video playing method of this disclosure. The application scene to which the method in the embodiments of this disclosure can be applied is not limited thereto.

To further illustrate the technical solutions of the embodiments of this disclosure, the technical solutions will be described in further detail in conjunction with the drawings and specific implementations. Although the embodiment of this disclosure provides the operation steps of the method as described in the following embodiments or drawings, the method may include more or less operation steps. In the steps in which logically there is no necessary causal relationship, the execution order of the steps is not limited to the execution order provided by the embodiments of this disclosure. The method can be executed based on the order of the method shown in the embodiments or drawings, or can be executed in parallel during the actual processing or apparatus execution.

FIG. 3 shows a flowchart of a video playing method provided by an embodiment of this disclosure. The method may be performed by the computer device, and the computer device may be the terminal device 110 and/or the server 130 in FIG. 2. As shown in FIG. 3, the method includes the following steps.

S301: Acquire a target video in response to a video playing operation triggered for a target surface of a cubic geometric body. In an example, a first target surface of a geometric body on which a first target video is to be displayed is determined.

The cubic geometric body is a 3D object having a set physical shape, and the cubic geometric body may include a plurality of surfaces thereon. Each surface on the cubic geometric body may correspond to a video. The target video corresponding to the target surface may be acquired in response to the video playing operation triggered by the target object for any surface of the cubic geometric body, i.e., the target surface.

S302: Obtain pixel point sets corresponding to respective video frames included in the target video separately and map the respective video frames to the target surface successively based on a mapping relationship between position information about each pixel point in each pixel point set and position information about each vertex on the target surface. In an example, pixel point sets corresponding to respective video frames of the first target video are obtained. Each of the respective video frames is mapped to the first target surface based on a mapping relationship between position information of pixel points in the pixel point sets of the respective video frame and position information of a plurality of vertices on the first target surface. The respective video frames include a target video frame that is displayed on the first target surface based on the mapping of the target video frame to the first target surface. Further, in an example, the first target video is displayed on the first target surface of the geometric body based on the mapping of the respective video frames to the first target surface.

The respective video frames includes a target video frame, and the target video frame is played on the target surface after the target video frame is mapped to the target surface.

After the target video is acquired, for the target video frame, namely, any video frame of the respective video frames included in the target video, the following operations may be separately performed: mapping the target surface to a texture coordinate system to obtain a target texture coordinate plane and a first corresponding relationship, the first corresponding relationship being used for identifying each vertex on the target surface corresponding to a texture coordinate on the target texture coordinate plane; adjusting a picture dimension of the target video frame to obtain a second corresponding relationship according to an image dimension of the target texture coordinate plane, the second corresponding relationship being used for identifying each pixel point in the adjusted target video frame corresponding to a texture coordinate on the target texture coordinate plane; and mapping the respective pixel points to vertices having a same texture coordinate in the target surface separately based on the mapping relationship obtained by the first corresponding relationship and the second corresponding relationship.

In an example, texture mapping is a square pattern or image applied to the surfaces of the object. It can change the color, brightness, other appearance, and the like of the surfaces of the object. Texture mapping can make the 3D object appear more realistic.

In 3D technologies, the texture mapping may be mapped to the appearance of the 3D model by a UV coordinate. UV is the abbreviation of the texture coordinate system. The texture coordinate system has two coordinate axes of U and V. U represents the distribution on the horizontal coordinate, and V represents the distribution on the vertical coordinate. The two have a value range of 0-1, indicating the percentage distance of a certain point from the origin of the texture coordinate system (0, 0). For example, U coordinate of 0.3 indicates that the point is at the horizontal position 30% away from the origin.

The color information of each pixel point on the texture mapping may be located and acquired by the UV coordinate, and the 3D object is composed of vertices. By binding the corresponding relationship between the UV coordinate and the vertices of the 3D object, the color information of a certain pixel point on the texture mapping may be accurately correspond to a certain vertex on the surfaces of the 3D object. By this mapping relationship, it can be determined what appearance appears on the surfaces of the 3D object.

In other words, UV can be understood as "peeling" the surfaces of the 3D object and then spreading out the surfaces to a 2D plane. Only the 2D texture mapping needs to be modified when the appearance of the 3D object needs to be changed so as to facilitate modification and operation.

For example, the 3D object is a sphere, the texture mapping is an earth pattern, and the earth pattern is pasted on the surfaces of the sphere. The process of pasting the 2D texture mapping on the surfaces of the 3D object will be described. As shown in FIG. 4, all the vertices on the surfaces of the sphere are spread out to the UV plane, and then the earth pattern is stretched into a square and corresponds to the UV plane. As such, after the mapping relationship, each vertex of the surfaces of the 3D object corresponds to the color information of the respective pixel points in the texture mapping.

When each video frame is mapped to the target surface successively based on the mapping relationship between the video frame and the target surface, every time a video frame is mapped, the video frame is played. Namely, every time a video frame of the target video is mapped to the target surface of the cubic geometric body, the target object can view the picture content of the video frame on the target surface.

Alternatively, a plurality of cubic geometric bodies may be freely combined to obtain a 3D object having a set shape, and the corresponding video is mapped as the texture mapping to the respective surfaces of the obtained 3D object.

In an embodiment, the video playing method provided by this disclosure may also be implemented according to the process shown in FIG. 5a. As shown in FIG. 5a, the method includes the following steps.

S501: Create a video element.

The video element may be added to the video playing page.

In an example, a video container may be added on the video playing page using a <video> tag, and <video> is a tag used by HTML5 to define the video. By the tag, the video may be played on the video playing page.

When embedding a video in the video playing page, by specifying a "display: none" style, the video may be invisible in the video playing page. This is because the video needs to be applied as the texture mapping to the surfaces of the 3D model, rather than rendering the video directly on the video playing page. The detailed codes may be as follows:

```
<video id="video" loop crossOrigin="anonymous" play-
    sinline style="display: none">
<source src="videos/abc.mp4" type="video/mp4">
</video>
```

Figure 5B:
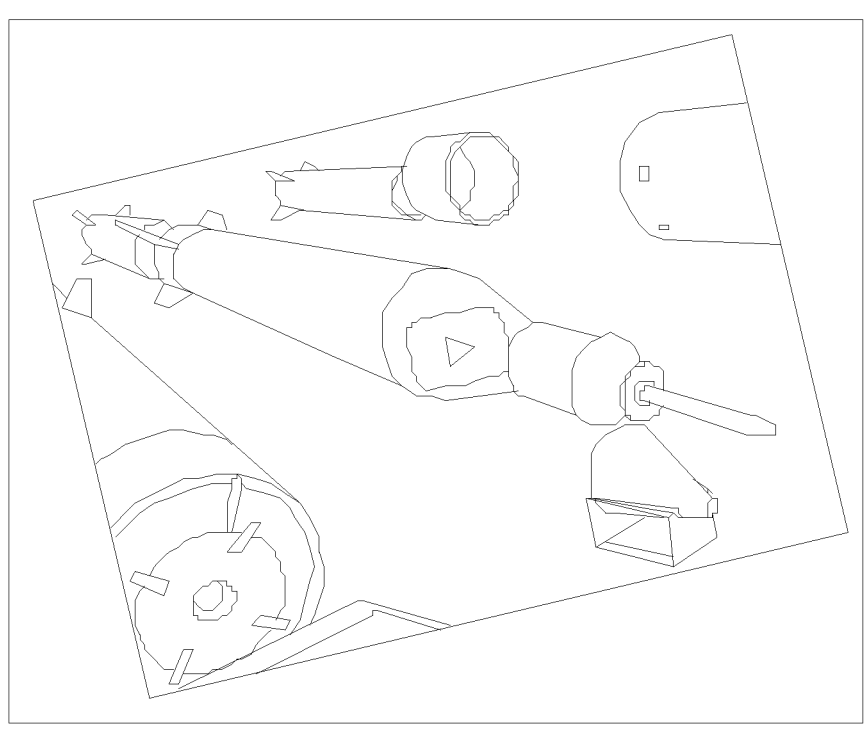
FIG. 5*b* is a schematic diagram of adding a start button into a video in an embodiment of this disclosure.

The HTML5 specification requires that videos need to be started by the target object's touch screen behavior, so a start button needs to be added to each video to guide the target object to click the screen. As shown in FIG. 5b, the play button in the middle of the video is the start button for guiding the target object to click the screen.

In an example, the first frame of the picture of the video is intercepted in advance and used as the initial texture mapping of the surfaces of the 3D model, so that the first frame of the picture of the video appears on the 3D model. The play button is added to the first frame of the picture of the video, and listening is performed for a screen click event.

In addition, instead of intercepting the first frame of the picture of the video, only the play button or only a prompt text may be displayed for the target object to click the screen.

After listening to the click event of the target object, the video may be played on the surfaces of the 3D model. The relevant codes may be as follows:

```
const startButton = document.getElementById("startButton"); //Acquire
button on page
  startButton.addEventListener("click", function( )
  {
    const video = document.getElementById("video"); //Acquire video
    object
    video.play( ); //Play video
  }); //Click event of listening button
```

S502: Bind the video element to a video texture.

The general texture mapping is a 2D image. The surface time of the 3D model is changed by constantly changing the texture mapping. Finally, the appearance of the 3D model is changed when the WebGL drives the graphics card to execute a screen rendering instruction.

When the video picture changes, the picture of the current video is collected and then applied as new texture mapping to the surfaces of the 3D model.

VideoTexture is a video texture encapsulated by the Threejs engine. By it, a texture object using a video as the mapping may be created.

VideoTexture automatically obtains each frame of the picture of the video based on the playing of the video, and converts the frame of the picture into the texture mapping of the square that can be used by the Threejs engine.

The video element created in S501 may be bound to the video texture, so that the video texture is automatically updated when the picture of the video changes. The codes for creating the video texture may be as follows:

const video=document.getElementById("video"); //Acquire video object
 const texture=new THREE.VideoTexture(video); //Input video object into video texture

S503: Create a geometry and a surface material of a 3D model.

To create the 3D model in Threejs, two attributes are required: the geometry and the material. The geometry is used for defining the physical shape of the 3D model, such as a UV coordinate, a vertex position vector, a patch index, and a normal vector. The material is used for defining the visual appearance of the 3D model, such as the color, shading, and transparency.

PlaneGeometry is a class used in Threejs to create a planar cube, and PlaneGeometry can be used as the geometry of the 3D model.

Figure 5C:
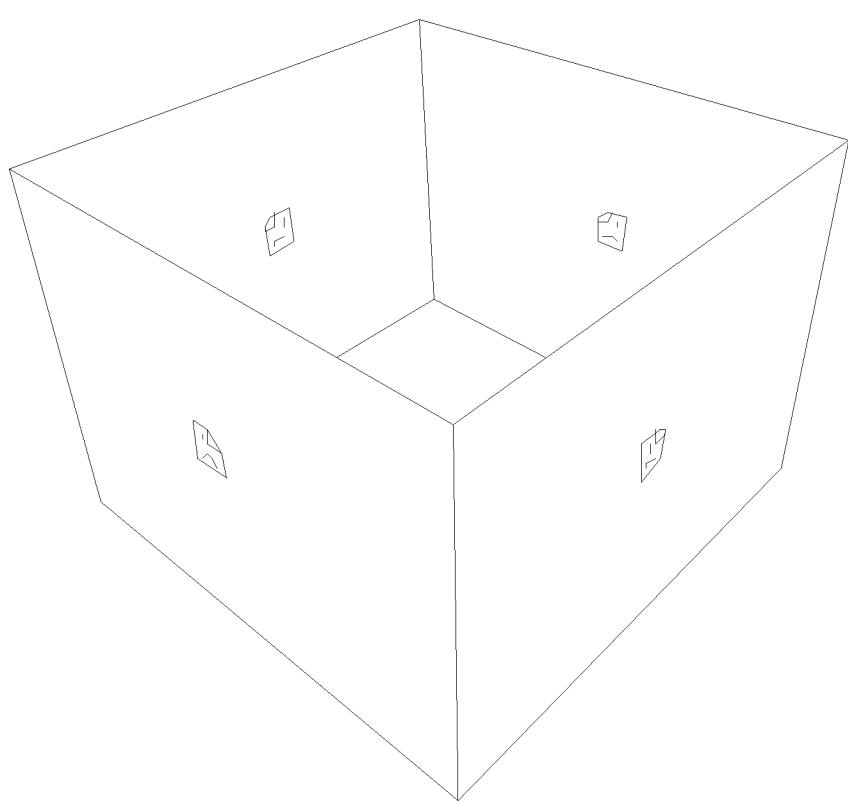
FIG. 5*c* is a schematic diagram of a 3D model only including a geometry in an embodiment of this disclosure.

MeshLambertMaterial is a surface material used in Threejs to indicate that there is no specular high gloss, and MeshLambertMaterial can be used as the surface material of the 3D model. The texture mapping is bound to the surface material to be eventually understood and used by the Threejs engine, and the effect of not binding the texture to the surface material can be seen in FIG. 5c. Only the geometry of the 3D model can be seen.

The embodiments of this disclosure only uses MeshLambertMaterial as the surface material of the 3D model in order to prevent the video from reflecting. in practical application, the surface material of the 3D model is not limited by any material type.

S504: Bind the video texture to the surface material of the 3D model.

After the geometry and the surface material of the 3D model are created, the video texture created in S502 can be bound to the surface material by the map parameters of MeshLambertMaterial. The relevant codes of binding the video texture to the surface material may be as follows:

//Create geometry, xsize, ysize, and zsize are length, width, and height of 3D model respectively
 let geometry=new THREE.BoxBufferGeometry(xsize, ysize, zsize);
 //Create surface material, specify color and texture map for surface material, and input video texture created above as mapping to the surface texture
 let material=new THREE.MeshLambertMaterial({color: 0xffffff, map: texture});

//Create video fragments using geometry and surface material
 let mesh=new THREE.Mesh(geometry, material);

When the video texture created in S502 is applied to the surface material of the 3D object, the process in S504 is automatically performed again as long as new texture mapping is generated due to the characteristics of the video texture.

Figure 5D:
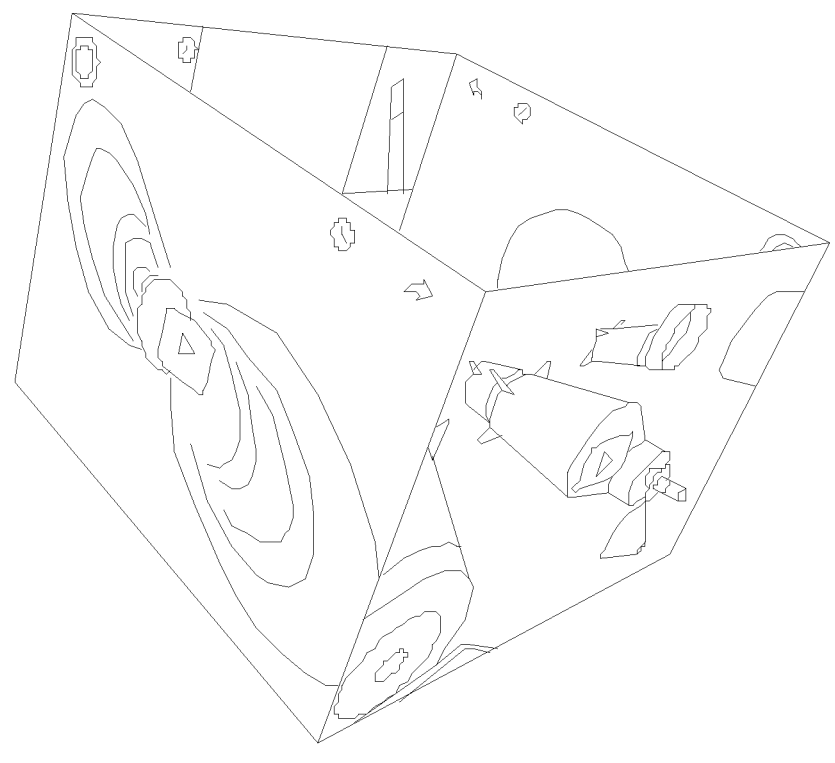
FIG. 5*d* is a schematic diagram of a 3D model pasted with a video on a surface in an embodiment of this disclosure.

By the related flow shown in FIG. 5a, as shown in FIG. 5d, a 3D model in a shape of a magic cube can be created as a cubic geometric body, and the video is pasted as a texture to each surface of the magic cube.

After mapping the video texture to the surface of the cubic geometric body by the surface material, every time the WebGL renders a picture, the latest pattern of the video texture is presented to the appearance of the surfaces of the cubic geometric body in the original UV coordinate. As such, the played video can be seen on the surfaces of the cubic geometric body.

According to the video playing method provided by an embodiment of this disclosure, a current picture is captured in real time when a video is played. The picture of the video is updated to a map texture of a 3D model at each time of screen rendering. Finally, the appearance of the 3D model changes synchronously with the change of the picture of the video in real time by texture mapping, visually as if the video is played on the 3D model to enrich the expressiveness of the 3D scene. In addition, according to the needs of the project, the 3D model may be freely combined, and the position of the 3D camera may be changed to further enrich the interaction form between the target object and the video, stimulate the curiosity of the target object, and improve the viewing and interaction interests of the target object.

In some embodiments, when playing the target video, a picture dimension or a playing direction of the target video played on the target surface of the cubic geometric body may be adjusted in response to a picture adjustment operation triggered for the target surface.

In particular, the picture dimension of the target surface may be reduced in response to a multi-finger gathering operation triggered for the target surface. In addition, the degree of reduction of the picture dimension of the target surface is determined by the multi-finger gathering operation triggered for the target surface.

Figure 6A:
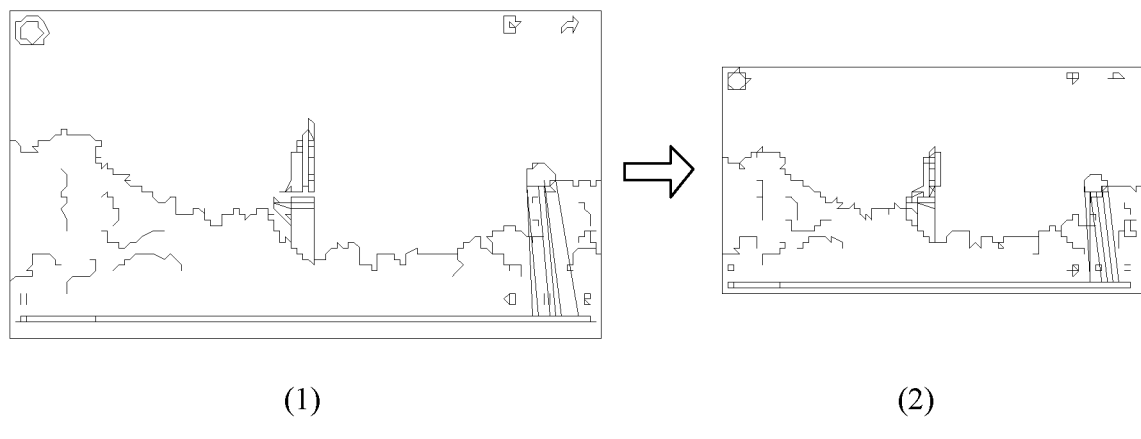
FIG. 6*a* is a schematic diagram of reducing a picture dimension of a target surface in an embodiment of this disclosure.

For example, FIG. 6a (1) is a picture currently displayed on the target surface. In response to the multi-finger gathering operation triggered by the target object for the target surface, the picture dimension displayed in FIG. 6a (1) may be reduced such that the picture as shown in FIG. 6a (2) is displayed on the target surface.

The picture dimension of the target surface may be magnified in response to a multi-finger magnification operation triggered for the target surface. In addition, the degree of magnification of the picture dimension of the target surface is determined by the multi-finger magnification operation triggered for the target surface.

Figures 6B, 6C:
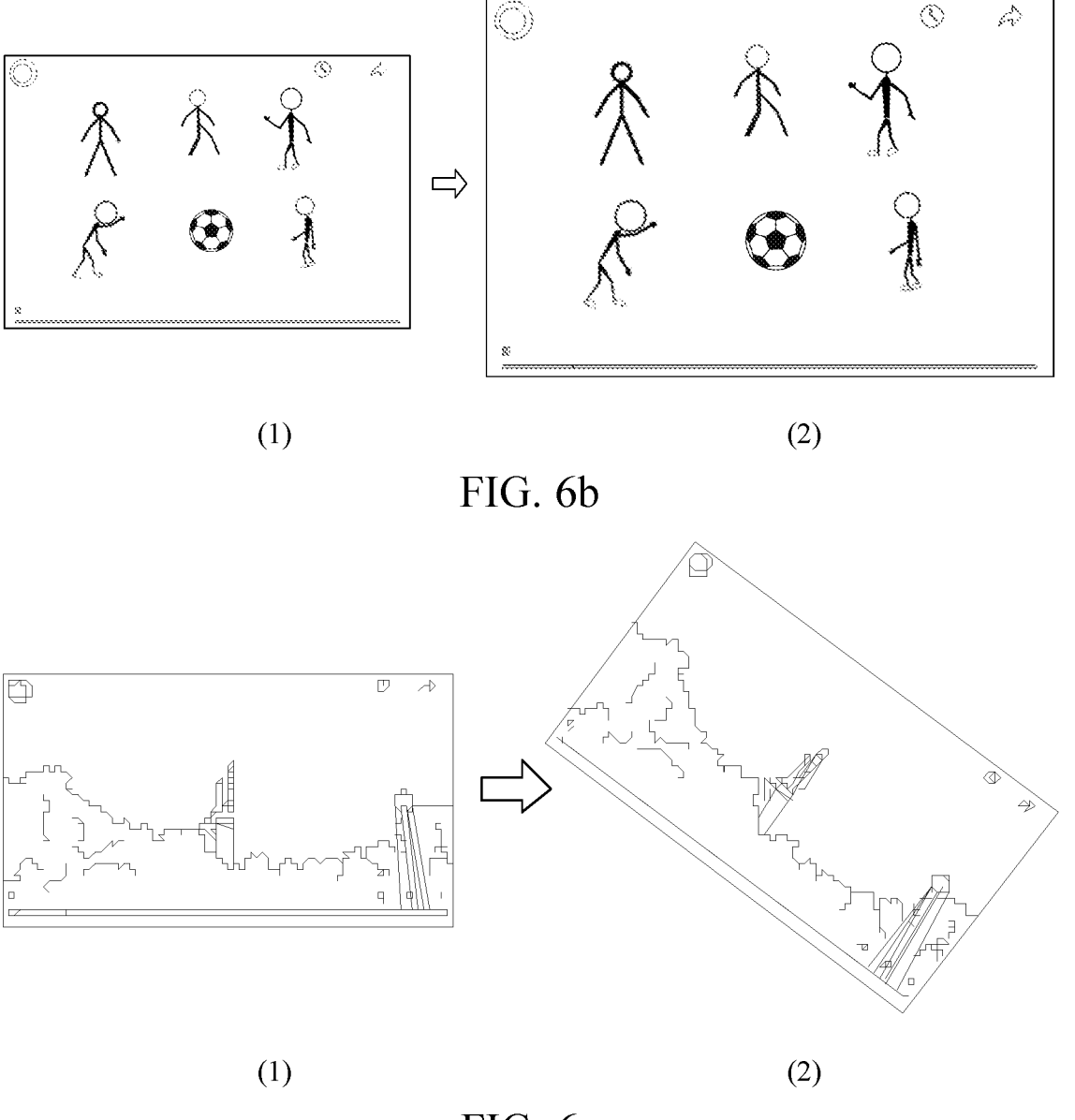
FIG. 6*b* is a schematic diagram of magnifying a picture dimension of a target surface in an embodiment of this disclosure.
FIG. 6*c* is a schematic diagram of rotating a playing direction of a target surface in an embodiment of this disclosure.

For example, FIG. 6b (1) is a picture currently displayed on the target surface. In response to the multi-finger magnification operation triggered by the target object for the target surface, the picture dimension displayed in FIG. 6b (1) may be magnified such that the picture as shown in FIG. 6b (2) is displayed on the target surface.

The target surface may be rotated to a respective playing direction in response to a picture drag and rotation operation triggered for the target surface. When the playing direction of the target surface is rotated, the target surface is rotated to the respective playing direction based on the rotated target direction indicated by the triggered picture drag and rotation operation.

For example, FIG. 6*c* (1) is a picture currently displayed on the target surface. The picture displayed in FIG. 6*c* (1) may be rotated by 45° to the right so that the picture as shown in FIG. 6*c* (2) is displayed on the target surface in response to the picture drag and rotation operation triggered by the target object for the target surface, and the picture drag and rotation operation indicates to rotate by 45° to the right.

In some other embodiments, the cubic geometric body includes a plurality of surfaces. In response to some operations triggered by the target object for the cubic geometric body, it can switch from one surface of the cubic geometric body to another. Moreover, a video may be played correspondingly on each surface. When the target object views the video on one surface of the cubic geometric body, in response to a switching operation triggered for any surface of the cubic geometric body, the target object may switch from the current surface of the cubic geometric body to another surface and view the video played on another surface.

In particular, the cubic geometric body may include a target surface and at least one candidate surface, and each candidate surface is associated with a respective candidate video. In response to a trigger operation for any candidate surface, the triggered candidate surface may be taken as a new target surface, and it switches from the target surface to the new target surface. In response to a video playing operation triggered for the new target surface, a candidate video associated with the new target surface may be mapped to the new target surface for playing.

A candidate surface selected by sliding by the target object may be taken as the new target surface in response to a sliding operation triggered by the target object for any one of the candidate surfaces.

Figure 7A:
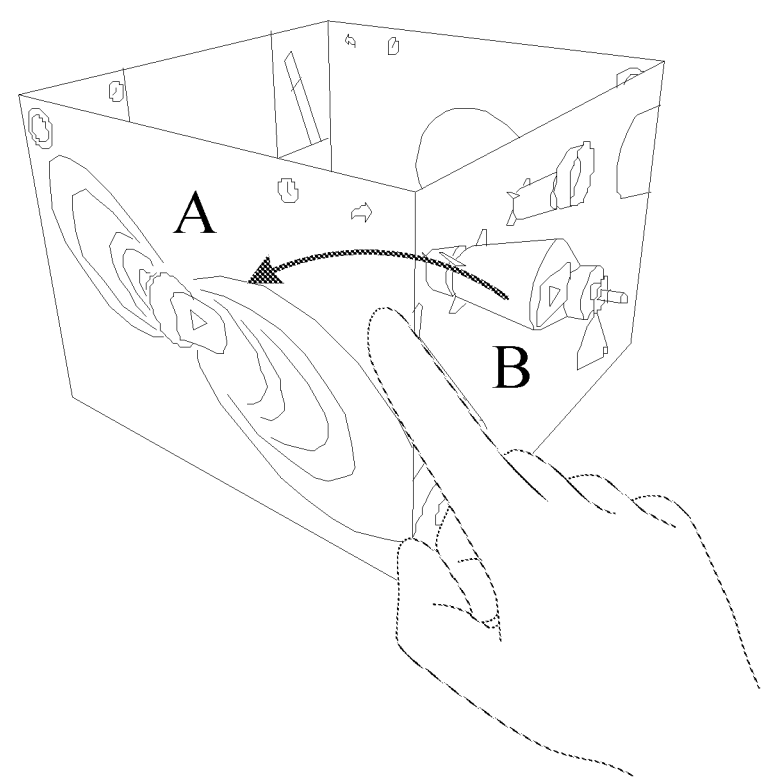
FIG. 7*a* is a schematic diagram of switching a candidate surface by sliding in an embodiment of this disclosure.

For example, as shown in FIG. 7*a*, the cubic geometric body is a magic cube. Assuming that the target surface is surface A in the magic cube, in response to the sliding operation triggered for surface B, it can slide to switch from surface A to surface B, and take surface B as the new target surface. For example, when the target object clicks to play the video on surface B, the video associated with surface B may be mapped to surface B, and the video may be played on surface B.

Further, when the cubic geometric body is a magic cube, and the fingers of the target object move in the same direction, the magic cube may be rotated in the moving direction. A surface originally located behind the magic cube may be rotated to the front of the magic cube as long as the sliding distance is far enough to be seen by the target object.

A candidate surface selected by clicking may be taken as the new target surface in response to a clicking operation triggered for any one of the candidate surfaces.

Figure 7B:
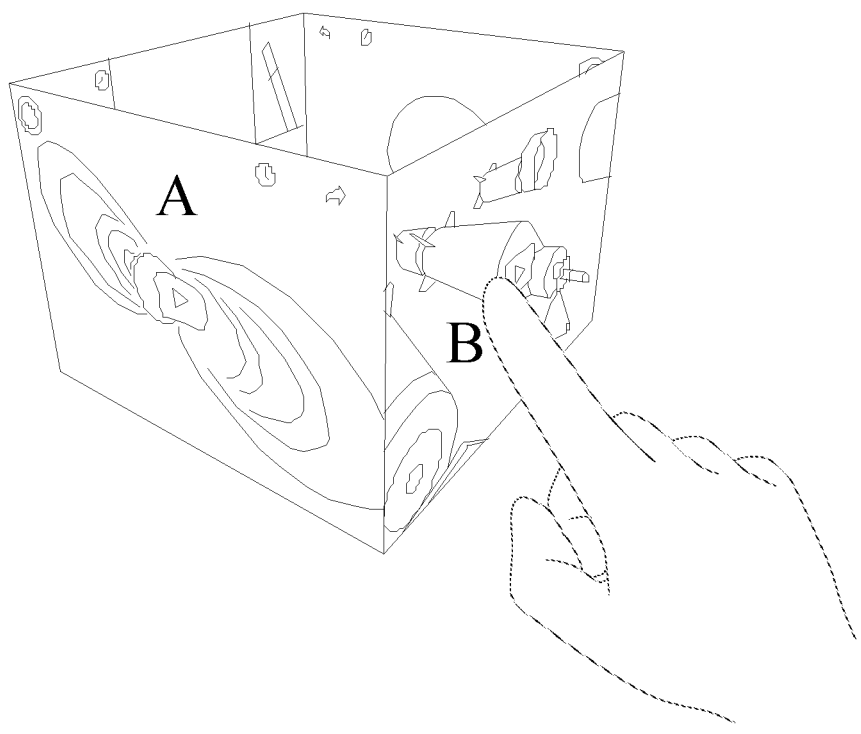
FIG. 7*b* is a schematic diagram of switching a candidate surface by clicking in an embodiment of this disclosure.

For example, as shown in FIG. 7*b*, the cubic geometric body is a magic cube. Assuming that the target surface is surface A in the magic cube, in response to the clicking operation triggered by the target object for surface B, it can switch from surface A to surface B, and take surface B as the new target surface. When the target object clicks to play the video on surface B, the video associated with surface B may be mapped to surface B, and the video may be played on surface B.

It can switch from a current viewpoint to a target viewpoint in response to a viewpoint switching operation triggered for any one of the candidate surfaces, and a candidate surface located in the target viewpoint and opposite the target surface is taken as the new target surface.

In an example, the cubic geometric body includes an inner surface and an outer surface. For example, as shown in FIG. 5*d*, when the cubic geometric body is a magic cube, there are 4 surfaces at the outside of the magic cube and 4 surfaces at the inside of the magic cube, and a video may be correspondingly played on each of 8 surfaces at the inside and outside of the magic cube.

It can switch from an outside of the cubic geometric body to an inside of the cubic geometric body in response to a multi-finger reverse sliding operation triggered for any one of the candidate surfaces in a case that the current viewpoint is located at the outside of the cubic geometric body, and the inside of the cubic geometric body is taken as the target viewpoint.

Figure 8A:
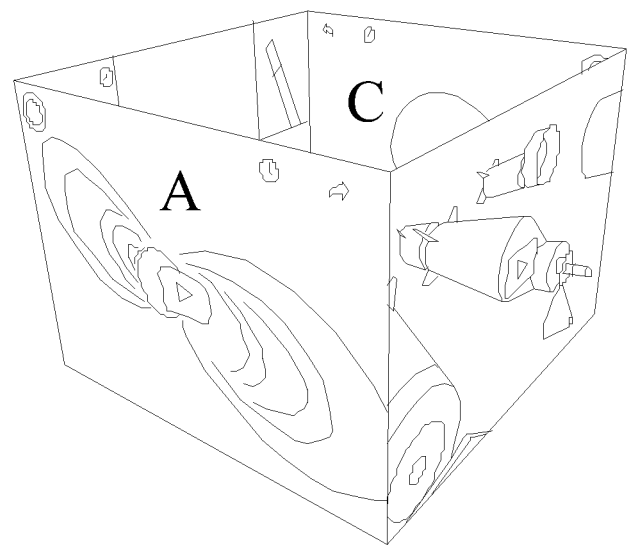
FIG. 8*a* is a schematic diagram of viewpoint switching in an embodiment of this disclosure.
Figure 8B:
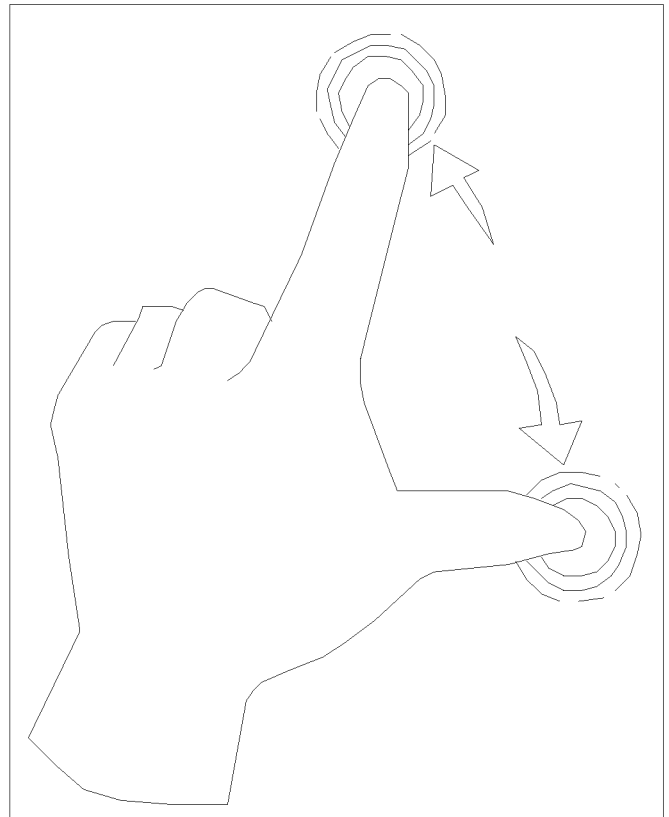
FIG. 8*b* is a schematic diagram of a multi-finger reverse sliding operation in an embodiment of this disclosure.
Figure 8C:
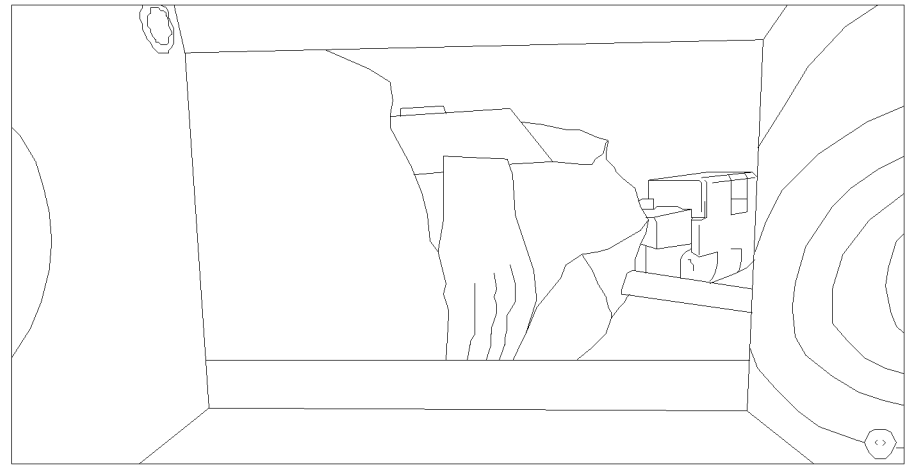
FIG. 8*c* is a schematic diagram of a video playing effect in an embodiment of this disclosure.

For example, as shown in FIG. 8*a*, the current viewpoint of the target object is located at the outside of the cubic geometric body, and the target surface is surface A. In response to the multi-finger reverse sliding operation of the target object triggered for surface C as shown in FIG. 8*b*, it can switch from the outside of the cubic geometric body to the inside of the cubic geometric body, and surface C located at the inside of the cubic geometric body and opposite surface A is taken as the new target surface. When the target object clicks to play the video on surface C, the video associated with surface C may be mapped to surface C and played on surface C, and the visual effect of playing the video on surface C may be as shown in FIG. 8*c*.

In addition, when the current viewpoint of the target object is located at the inside of the cubic geometric body, the target object may view a plurality of surrounding videos by sliding the screen left and right. If the picture content of each video is joined back and forth, the visual effect of the immersed exhibition hall may be simulated.

It switches from the inside of the cubic geometric body to the outside of the cubic geometric body in response to a multi-finger opposite sliding operation triggered for any one of the candidate surfaces in a case that the current viewpoint is located at the inside of the cubic geometric body, and the outside of the cubic geometric body is taken as the target viewpoint.

Figure 8D:
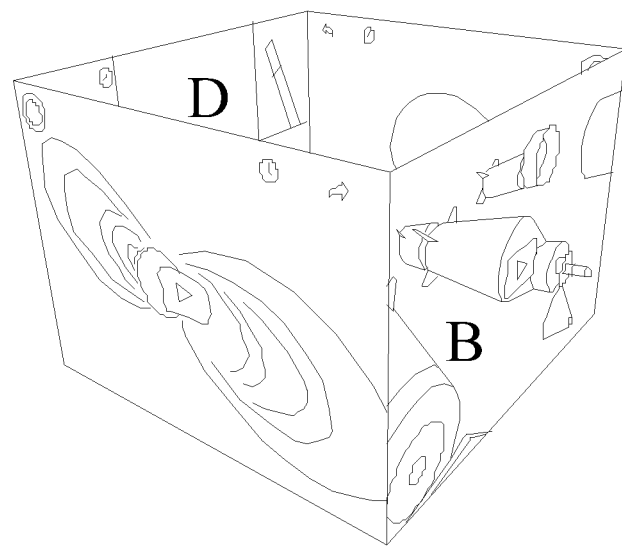
FIG. 8*d* is another schematic diagram of viewpoint switching in an embodiment of this disclosure.

For example, as shown in FIG. 8*d*, the current viewpoint of the target object is located at the inside the cubic geometric body, and the target surface is surface D. In response to the multi-finger opposite sliding operation of the target object triggered for surface B as shown in FIG. 8*e*, it can switch from the inside of the cubic geometric body to the outside of the cubic geometric body, and surface B located at the outside of the cubic geometric body and opposite surface D is taken as the new target surface. When the target object clicks to play the video on surface B, the video associated with surface B may be mapped to surface B and played on surface B.

In an embodiment, when the cubic geometric body is a magic cube, the position of the 3D camera may be changed if a plurality of fingers of the target object move in opposite directions. For example, when the plurality of fingers of the target object are close to each other in the manner shown in FIG. 8*e*, the 3D camera may be away from the center of the magic cube. When the plurality of fingers of the target object are distant from each other in the manner shown in FIG. 8*b*, the 3D camera may be close to the center of the magic cube.

In some embodiments, the overall process of the video playing method provided by this disclosure may be implemented based on the process as shown in FIG. 8*f*. As shown in FIG. 8*f*, the method includes the following steps.

S801: Create a video and bind the video to a video texture.

One or more videos to be mapped is created. The created videos are used as texture objects of mapping by VideoTexture to achieve the purpose of binding the videos to the video textures.

S802: Extract each frame of picture of the video and convert the same into texture mapping.

When the picture of the video changes, the video texture will extract the current picture of the video and convert the same into the texture mapping.

S803: Create a geometry and a surface material required for a 3D model.

Creating the 3D model requires two attributes: the geometry and the surface material. By the geometry and the surface material, the 3D model may be determined accordingly.

S804: Apply the converted texture mapping to the surface material of the 3D model.

After the geometry and the surface material of the 3D model are created, each frame of the picture of the video converted into the texture mapping in S802 may be pasted on the surface material of the 3D model. The process in S804 is automatically performed again as long as new texture mapping is generated due to the characteristics of the video texture.

In texture mapping, a respective video may be pasted on one or more surfaces of the 3D model as needed.

S805: Rotate the 3D model or change a position of a 3D camera in response to a trigger operation of a target object.

After the video is pasted as the texture mapping to the surfaces of the 3D model, the 3D model may be rotated, or the position of the 3D camera may be changed in response to the trigger operation of the target object.

In an example, any one of the following operations may be performed.

Switching to a surface of the 3D model selected by sliding by the target object may be performed in response to the sliding operation triggered by the target object.

Switching to a surface of the 3D model selected by clicking by the target object may be performed in response to the clicking operation triggered by the target object.

Switching from the outside of the 3D model to the inside of the 3D model may be performed in response to the multi-finger reverse sliding operation triggered by the target object in a case that the current position of the 3D camera is located at the outside of the 3D model.

Switching from the inside of the 3D model to the outside of the 3D model may be performed in response to the multi-finger opposite sliding operation triggered by the target object in a case that the current position of the 3D camera is located at the inside of the 3D model.

Reducing a picture dimension on a surface of the 3D model may be performed in response to the multi-finger gathering operation triggered by the target object.

Magnifying a picture dimension on a surface of the 3D model may be performed in response to the multi-finger magnification operation triggered by the target object.

Rotating a picture on a surface of the 3D model to a respective playing direction may be performed in response to the picture drag and rotation operation triggered by the target object.

S806: Use WebGL to render a picture of the video on a screen.

WebGL will re-render the screen every frame because the texture mapping of the model material changes, resulting in the constant change of appearance of the model. As such, the visual effect of playing the video on the surfaces of the 3D model can be obtained.

According to the video playing method provided in an embodiment of this disclosure, a plurality of videos is projected on different surfaces of a cubic geometric body for playing based on texture mapping. It is realized by continuously replacing the texture mapping of various surface materials in each frame rendered by WebGL. A video may correspond to a surface or a plurality of surfaces. The cubic geometric body may be set to any shape as needed. The target object may switch the surfaces of the cubic geometric body by a respective sliding or clicking operation to view the video on different surfaces, and may also control the 3D camera to enter the inside of the cubic geometric body to obtain a simulated viewing experience of the panoramic exhibition hall, enrich the visual representation ways of the video in 3D, and improve the interaction interest of the target object.

Similar to the video playing method shown in FIG. 3, an embodiment of this disclosure further provides a video playing apparatus, and the video playing apparatus may be arranged in the server or the terminal device. The apparatus is an apparatus corresponding to the video playing method of this disclosure, and the principle of the apparatus for solving the problem is similar to the method for example. Therefore, for an exemplary implementation of the apparatus reference may be made to the implementation of the above method, and the repeated parts will not be described in detail.

Figure 9:
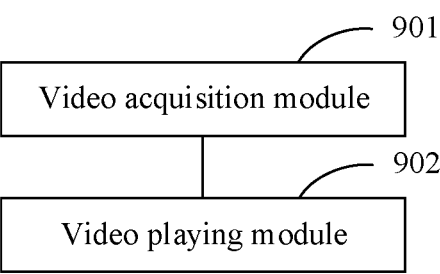
FIG. 9 is a schematic structural diagram of a video playing apparatus in an embodiment of this disclosure.

FIG. 9 shows a schematic structural diagram of a video playing apparatus provided by an embodiment of this disclosure. As shown in FIG. 9, the video playing apparatus includes a video acquisition module 901 and a video playing module 902.

The video acquisition module 901 is configured to acquire a target video in response to a video playing operation triggered by the target object for a target surface of a cubic geometric body.

The video playing module 902 is configured to obtain pixel point sets corresponding to respective video frames included in the target video separately and map the respective video frames to the target surface successively based on a mapping relationship between position information about each pixel point in each pixel point set and position information about each vertex on the target surface, the respective video frames including a target video frame, and the target video frame being played on the target surface after the target video frame is mapped to the target surface.

Alternatively, the video playing module 902 is configured to map the target surface to a texture coordinate system for the target video frame to obtain a target texture coordinate plane and a first corresponding relationship, the first corresponding relationship being used for identifying each vertex on the target surface corresponding to a texture coordinate on the target texture coordinate plane.

The video playing module 902 is configured to adjust a picture dimension of the target video frame to obtain a second corresponding relationship according to an image dimension of the target texture coordinate plane, the second corresponding relationship being used for identifying each pixel point in the adjusted target video frame corresponding to a texture coordinate on the target texture coordinate plane.

The video playing module 902 is configured to map the pixel points of the target video frame to vertices having a same texture coordinate in the target surface separately based on the mapping relationship obtained by the first corresponding relationship and the second corresponding relationship.

Figure 10:
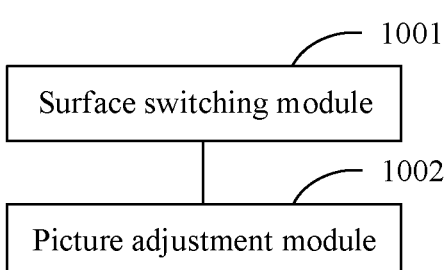
FIG. 10 is a schematic structural diagram of another video playing apparatus in an embodiment of this disclosure.

Alternatively, the cubic geometric body further includes at least one candidate surface, and each candidate surface is associated with a respective candidate video. As shown in FIG. 10, the above apparatus may further include a surface switching module 1001, configured to The surface switching module 1001 is configured to take a triggered candidate surface as a new target surface in response to a trigger operation for any one of the candidate surfaces.

The surface switching module 1001 is configured to switch from the target surface to the new target surface.

The surface switching module 1001 is configured to map a candidate video associated with the new target surface to the new target surface for playing in response to a video playing operation triggered for the new target surface.

Alternatively, the surface switching module 1001 is further configured to take a candidate surface selected by sliding as the new target surface in response to a sliding operation triggered for any one of the candidate surfaces.

The surface switching module 1001 is configured to take a candidate surface selected by clicking as the new target surface in response to a clicking operation triggered for any one of the candidate surfaces.

The surface switching module 1001 is configured to switch from a current viewpoint to a target viewpoint in response to a viewpoint switching operation triggered for any one of the candidate surfaces and taking a candidate surface located in the target viewpoint and opposite the target surface as the new target surface.

Alternatively, the surface switching module 1001 is further configured to switch from an outside of the cubic geometric body to an inside of the cubic geometric body in response to a multi-finger reverse sliding operation triggered by the target object for any one of the candidate surfaces in a case that the current viewpoint is located at the outside of the cubic geometric body, and take the inside of the cubic geometric body as the target viewpoint.

The surface switching module 1001 is configured to switch from the inside of the cubic geometric body to the outside of the cubic geometric body in response to a multi-finger opposite sliding operation triggered for any one of the candidate surfaces in a case that the current viewpoint is located at the inside of the cubic geometric body, and take the outside of the cubic geometric body as the target viewpoint.

Alternatively, as shown in FIG. 10, the above apparatus may further include a picture adjustment module 1002, configured to adjust a picture dimension or a playing direction of the target surface in response to a picture adjustment operation triggered for the target surface.

Alternatively, the picture adjustment module 1002 is configured to reduce the picture dimension of the target surface in response to a multi-finger gathering operation triggered for the target surface, magnify the picture dimension of the target surface in response to a multi-finger magnification operation triggered for the target surface, and rotate the target surface to a respective playing direction in response to a picture drag and rotation operation triggered for the target surface.

Based on the above method embodiment and apparatus embodiment, an embodiment of this disclosure further provides an electronic device.

In an embodiment, the electronic device may be a server, such as the server 130 shown in FIG. 2. In the embodiment, the structure of the electronic device may be shown in FIG.

11, including a memory 1101, a communication module 1103, and one or more processors 1102 (or processing circuitry).

The memory 1101 is configured to store the computer program executed by the processor 1102. The memory 1101 may include a storage program area and a storage data area. The storage program area may store operating systems, programs required to run instant communication functions, and the like. The storage data area may store various instant communication information, operation instruction sets, and the like.

The memory 1101 may be a volatile memory, such as a random-access memory (RAM). The memory 1101 may also be a non-volatile memory, such as a read-only memory (ROM), a flash memory, a hard disk drive (HDD), or a solid-state drive (SSD). The memory 1101 may also be any other media that can be used to carry or store desired program code in the form of instructions or data structures and can be accessed by the computer, but is not limited thereto. The memory 1101 may be a combination of the above memories.

The processor 1102 may include processing circuitry, such as one or more central processing units (CPU) or is a digital processing unit and the like. The processor 1102 is configured to implement the above video playing method when calling the computer program stored in the memory 1101.

The communication module 1103 is configured to communicate with the terminal device and other electronic devices. If the electronic device is a server, the server may receive the target video transmitted by the terminal device through the communication module 1103.

Figure 11:
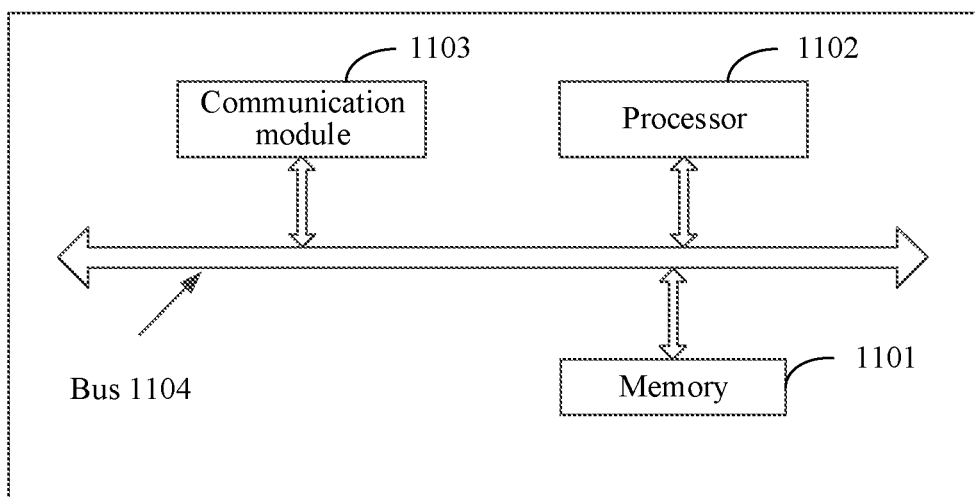
FIG. 11 is a schematic structural diagram of an electronic device in an embodiment of this disclosure.

The specific connection medium among the above memory 1101, the communication module 1103, and the processor 1102 is not limited in the embodiments of this disclosure. According to the embodiments of the present disclosure, in FIG. 11, the memory 1101 is connected to the processor 1102 by a bus 1104, and the bus 1104 is represented by a bold line in FIG. 11. The connection ways of other components are illustrative only and not intended to be limiting. The bus 1104 may be divided into an address bus, a data bus, a control bus, and the like. For ease of illustration, only one bold line is shown in FIG. 11, but it does not indicate that there is only one bus or one type of bus.

In another embodiment, the electronic device may be any electronic device, such as a mobile phone, a tablet computer, a point of sales (POS), a vehicle-mounted computer, a smart wearable device, and a PC. The electronic device may be the terminal device 110 shown in FIG. 2.

Figure 12:
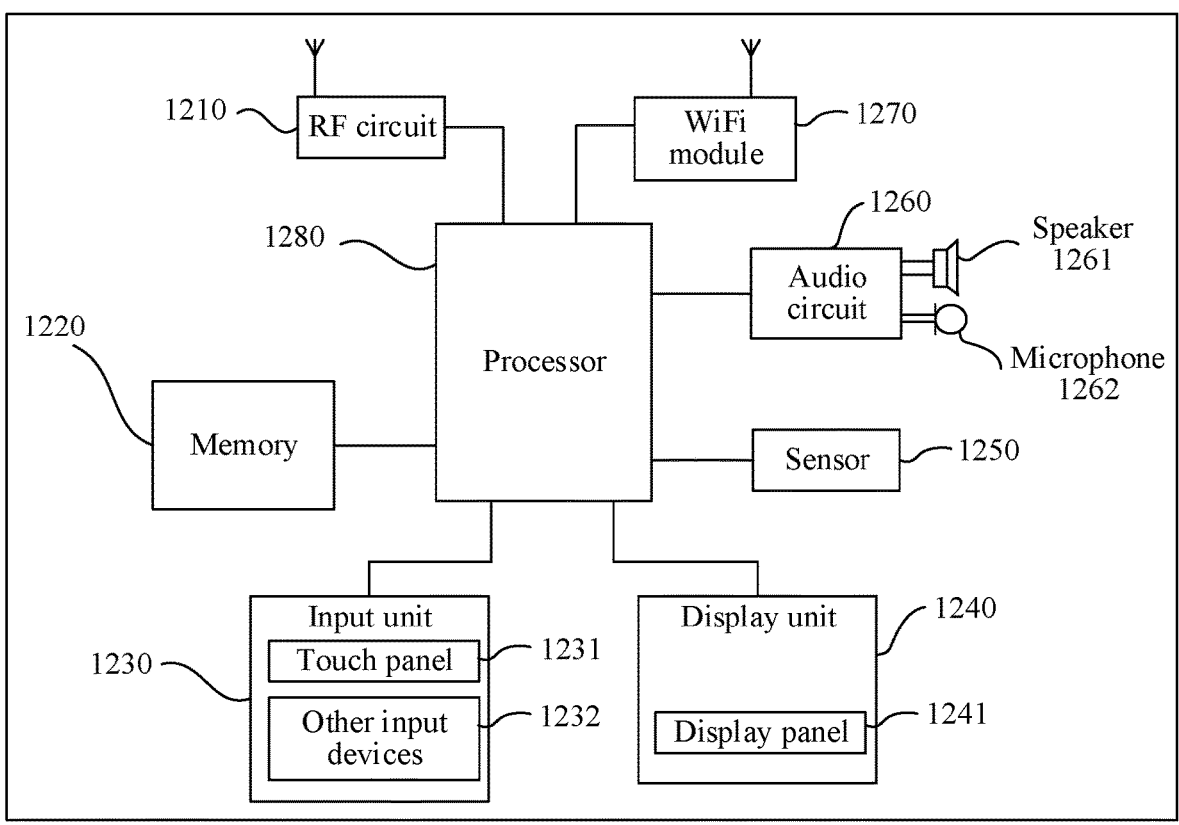
FIG. 12 is a schematic structural diagram of another electronic device in an embodiment of this disclosure.

FIG. 12 shows a structural block diagram of an electronic device provided by an embodiment of this disclosure. As shown in FIG. 12, the electronic device includes a radio frequency (RF) circuit 1210, a memory 1220, an input unit 1230, a display unit 1240, a sensor 1250, an audio circuit 1260, a WiFi module 1270, and a processor 1280. It will be understood by those skilled in the art that the structure of the electronic device shown in FIG. 12 are not limiting the electronic device. Compared with the illustration, it may include more or fewer components, combine some components, or make a different arrangement of components The constituent components of the electronic device are described in further detail below with reference to FIG. 12.

The RF circuit 1210 may be configured to receive and transmit signals in the process of transceiving information or calling. In particular, after receiving downlink information about a base station, the downlink information is processed by the processor 1280. In addition, the uplink data designed is transmitted to the base station.

The memory 1220 may be configured to store a software program and a module. As a program instruction/module corresponding to the video playing method and apparatus in the embodiments of this disclosure, the processor 1280 runs the software program and module stored in the memory 1220 so as to perform various functional applications and data processing of the electronic device, e.g., the video playing method provided by the embodiments of this disclosure. The memory 1220 may include a storage program area and a storage data area. The storage program area may store an operating system, an application program of at least one application, and the like. The storage data area may store data and the like created according to the use of the electronic device.

The input unit 1230 may be configured to receive numeric or character information inputted by the target object, and produce key signal inputs related to the target object setting and functional control of the terminal.

Alternatively, the input unit 1230 may include a touch panel 1231 and other input devices 1232.

The touch panel 1231, also referred to as a touchscreen, may collect the touch operations of the target object on or near the touch panel (such as an operation of using, by the target object, any suitable object or accessory, such as a finger and a stylus on the touch panel 1231 or near the touch panel 1231), and realize the respective operations according to a pre-set program, such as an operation of clicking, by the target object, a quick identification of a functional module.

Alternatively, other input devices 1232 may include, but are not limited to, one or more of a physical keyboard, a function key (such as a volume control key and a switch key), a trackball, a mouse, and a joystick.

The display unit 1240 may be configured to display information inputted by the target object or interface information presented to the target object and various menus of the electronic device.

The display unit 1240 may include a display panel 1241. Alternatively, the display panel 1241 may be configured in the form of a liquid crystal display (LCD), an organic light-emitting diode (OLED), and the like.

Further, the touch panel 1231 may cover the display panel 1241. When the touch panel 1231 detects a touch operation on or near the touch panel, the operation is transmitted to the processor 1280 to determine the type of the touch event, and then the processor 1280 provides respective interface outputs on the display panel 1241 based on the type of the touch event.

In FIG. 12, the touch panel 1231 and the display panel 1241 are implemented as two separate components to implement input and input functions of the electronic device. But, in some embodiments, the touch panel 1231 may be integrated with the display panel 1241 to implement the input and output functions of the terminal.

The electronic device may further include at least one sensor 1250.

The audio circuit 1260, the speaker 1261, and the microphone 1262 may provide an audio interface between the target object and the electronic device.

The processor 1280 is the control center of the electronic device and utilizes various interfaces and lines to connect various portions of the overall electronic device to perform various functions and process data of the electronic device by running or executing software programs and/or modules stored in the memory 1220 and calling data stored in the memory 1220.

It can be understood that the structure shown in FIG. 12 is only illustrative. The electronic device may further include more or fewer components than the components shown in FIG. 12, or have a configuration different from the components shown in FIG. 12. The components shown in FIG. 12 may be implemented using hardware, software, or a combination thereof.

According to an aspect of this disclosure, there is provided a computer program product or a computer program, including a computer instruction stored in a computer-readable storage medium. The processor of the computer device reads the computer instruction from the computer-readable storage medium, and the processor executes the computer instruction to cause the computer device to perform the video playing method in the above embodiments.

In addition, the embodiment of this disclosure also provides a storage medium storing a computer program. The computer program is used for executing the method provided by the above embodiment. In an example, the storage medium includes a non-transitory computer-readable storage medium storing instructions which when executed by a processor cause the processor to perform any of the methods described above.

The program product may use any combination of one or more readable media. The readable medium may be a readable signal medium or a readable storage medium. The readable storage medium may be, for example, but is not limited to, an electric, magnetic, optical, electromagnetic, infrared, or semiconductor system, apparatus, or device, or any combination thereof. More specific examples (a non-exhaustive list) of the readable storage media include: an electrical connection having one or more conducting wires, a portable disk, a hard disk, the RAM, the ROM, an erasable programmable ROM (EPROM or a flash memory), an optical fiber, a portable compact disk ROM (CD-ROM), an optical storage device, a magnetic storage device, or any suitable combination thereof.

The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

The above only describes exemplary implementations of this disclosure, but the scope of protection of this disclosure is not limited thereto. It will be apparent to those skilled in the art that various changes and substitutions may be made which are within the scope of this disclosure.

What is claimed is:

1. A method for displaying video, the method comprising:
determining a first target surface of a geometric body on which a first target video is to be displayed;
obtaining pixel point sets corresponding to respective video frames of the first target video;
mapping the first target surface to a texture coordinate system to obtain a texture coordinate plane, each of a plurality of vertices on the first target surface corresponding to a respective texture coordinate on the texture coordinate plane based on a first mapping relationship;
adjusting picture dimensions of each of the respective video frames according to image dimensions of the texture coordinate plane such that each of a plurality of pixel points of the adjusted video frame corresponds to a respective texture coordinate on the texture coordinate plane based on a second mapping relationship;
mapping the plurality of pixel points of each of the adjusted respective video frames to the texture coordinate plane based on the second mapping relationship;
mapping the plurality of pixel points of each of the adjusted respective video frames on the texture coordinate plane to the first target surface based on the first mapping relationship, the respective video frames including a target video frame that is displayed on the first target surface based on the mapping of the target video frame to the first target surface; and
displaying the first target video on the first target surface of the geometric body based on the mapping of the respective video frames to the first target surface.

2. The method according to claim 1, wherein
the geometric body includes a plurality of target surfaces, each of the plurality of target surfaces being associated with a different target video, and
the determining the first target surface of the geometric body includes determining the first target surface based on a user input to play the first target video.

3. The method according to claim 2, wherein
the plurality of target surfaces includes at least one exterior surface of the geometric body and at least one interior surface of the geometric body.

4. The method according to claim 1, wherein the geometric body includes at least one candidate surface, and the method further comprises:
receiving a user selection of a second target surface from the at least one candidate surface;
mapping the second target surface to the texture coordinate system to obtain a second texture coordinate plane;
mapping a second target video associated with the second target surface to the second texture coordinate plane, and mapping the second target video on the second texture coordinate plane to the second target surface based on the received user selection of the second target surface; and displaying the second target video on the second target surface of the geometric body based on the mapping of the second target video to the second target surface.

5. The method according to claim 4, wherein the receiving the user selection comprises:
receiving a user input to change an orientation of the geometric body; and
determining the second target surface based on the changed orientation of the geometric body.

6. The method according to claim 5, wherein
the first target surface of the geometric body includes a first one of an exterior surface and an interior surface of the geometric body, and
the second target surface of the geometric body includes a second one of the exterior surface or the interior surface of the geometric body.

7. The method according to claim 1, further comprising:
adjusting a display dimension of the first target video displayed on the first target surface based on a change to at least one of a size or an orientation of the geometric body.

8. The method according to claim 7, wherein the adjusting the display dimension comprises:
reducing the display dimension of the first target video displayed on the first target surface in response to a first user input;
increasing the display dimension of the first target video displayed on the first target surface in response to a second user input; and
changing an orientation of the first target video displayed on the first target surface in response to a third user input.

9. A video processing apparatus, comprising:
processing circuitry configured to:
determine a first target surface of a geometric body on which a first target video is to be displayed;
obtain pixel point sets corresponding to respective video frames of the first target video;
map the first target surface to a texture coordinate system to obtain a texture coordinate plane, each of a plurality of vertices on the first target surface corresponding to a respective texture coordinate on the texture coordinate plane based on a first mapping relationship;
adjust picture dimensions of each of the respective video frames according to image dimensions of the texture coordinate plane such that each of a plurality of pixel points of the adjusted video frame corresponds to a respective texture coordinate on the texture coordinate plane based on a second mapping relationship;
map the plurality of pixel points of each of the adjusted respective video frames to the texture coordinate plane based on the second mapping relationship;
map the plurality of pixel points of each of the adjusted respective video frames on the texture coordinate plane to the first target surface based on the first mapping relationship, the respective video frames including a target video frame that is displayed on the first target surface based on the mapping of the target video frame to the first target surface; and
display the first target video on the first target surface of the geometric body based on the mapping of the respective video frames to the first target surface.

10. The video processing apparatus according to claim 9, wherein the geometric body includes a plurality of target surfaces, each of the plurality of target surfaces being associated with a different target video, and the processing circuitry is configured to determine the first target surface based on a user input to play the first target video.

11. The video processing apparatus according to claim 10, wherein the plurality of target surfaces includes at least one exterior surface of the geometric body and at least one interior surface of the geometric body.

12. The video processing apparatus according to claim 9, wherein the geometric body includes at least one candidate surface, and the processing circuitry is configured to:

receive a user selection of a second target surface from the at least one candidate surface;

map the second target surface to the texture coordinate system to obtain a second texture coordinate plane;

map a second target video associated with the second target surface to the second texture coordinate plane, and map the second target video on the second texture coordinate plane to the second target surface based on the received user selection of the second target surface; and display the second target video on the second target surface of the geometric body based on the mapping of the second target video to the second target surface.

13. The video processing apparatus according to claim 12, wherein the processing circuitry is configured to:

receive a user input to change an orientation of the geometric body; and determine the second target surface based on the changed orientation of the geometric body.

14. The video processing apparatus according to claim 13, wherein the first target surface of the geometric body includes a first one of an exterior surface and an interior surface of the geometric body, and the second target surface of the geometric body includes a second one of the exterior surface or the interior surface of the geometric body.

15. The video processing apparatus according to claim 9, wherein the processing circuitry is configured to:

adjust a display dimension of the first target video displayed on the first target surface based on a change to at least one of a size or an orientation of the geometric body.

16. The video processing apparatus according to claim 15, wherein the processing circuitry is configured to:

reduce the display dimension of the first target video displayed on the first target surface in response to a first user input;

increase the display dimension of the first target video displayed on the first target surface in response to a second user input; and change an orientation of the first target video displayed on the first target surface in response to a third user input.

17. A non-transitory computer-readable storage medium storing instructions which, when executed by a processor, cause the processor to perform:

determining a first target surface of a geometric body on which a first target video is to be displayed;

obtaining pixel point sets corresponding to respective video frames of the first target video;

mapping the first target surface to a texture coordinate system to obtain a texture coordinate plane, each of a plurality of vertices on the first target surface corresponding to a respective texture coordinate on the texture coordinate plane based on a first mapping relationship;

adjusting picture dimensions of each of the respective video frames according to image dimensions of the texture coordinate plane such that each of a plurality of pixel points of the adjusted video frame corresponds to a respective texture coordinate on the texture coordinate plane based on a second mapping relationship;

mapping the plurality of pixel points of each of the adjusted respective video frames to the texture coordinate plane based on the second mapping relationship;

mapping the plurality of pixel points of each of the adjusted respective video frames on the texture coordinate plane to the first target surface based on the first mapping relationship, the respective video frames including a target video frame that is displayed on the first target surface based on the mapping of the target video frame to the first target surface; and displaying the first target video on the first target surface of the geometric body based on the mapping of the respective video frames to the first target surface.

18. The non-transitory computer-readable storage medium according to claim 17, wherein the geometric body includes a plurality of target surfaces, each of the plurality of target surfaces being associated with a different target video, and the determining the first target surface of the geometric body includes determining the first target surface based on a user input to play the first target video.

* * * * *